March 31, 1931. C. E. GALVIN 1,798,251
TOOL FOR TRIMMING PAPER
Filed Aug. 18, 1927
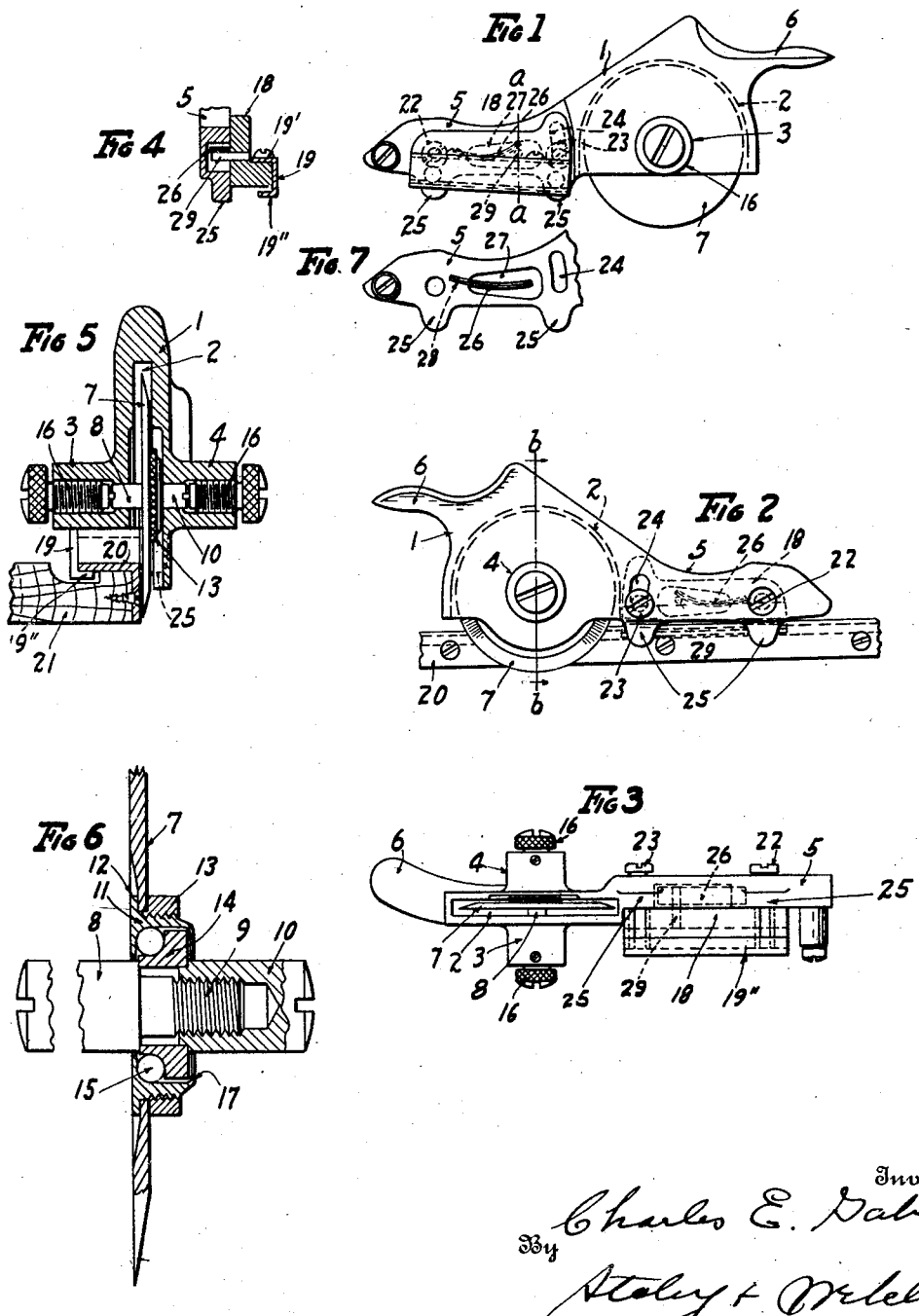

Patented Mar. 31, 1931

1,798,251

UNITED STATES PATENT OFFICE

CHARLES E. GALVIN, OF SPRINGFIELD, OHIO, ASSIGNOR TO THE RIDGELY TRIMMER COMPANY, OF SPRINGFIELD, OHIO, A CORPORATION OF OHIO

TOOL FOR TRIMMING PAPER

Application filed August 18, 1927. Serial No. 213,933.

This invention relates to an improvement in tools for trimming paper, more particularly relating to a tool especially adapted for trimming wall paper and designed to run upon a straight edge and having a rotating disk as a cutting element.

One of the objects of this invention is to provide improved means for mounting the cutting disk in the head of the tool whereby the disk may run upon anti-friction bearings and be readily assembled in the head, in connection with means for adjusting the disk and its bearing support axially in either direction.

A further object of the invention is to provide improved means for yieldably connecting the head of the tool with the gage.

Further objects of the invention will appear from the accompanying description and claims.

In the accompanying drawings:

Fig. 1 is an elevation of the rear side of a tool embodying my improvements.

Fig. 2 is an elevation of the forward side of the same.

Fig. 3 is a bottom plan view.

Fig. 4 is a section on the line $a$—$a$ of Fig. 1.

Fig. 5 is an enlarged section on line $b$—$b$ of Fig. 2.

Fig. 6 is an enlarged sectional view of the cutting disk and its supporting spindle.

Fig. 7 is an elevation of the inner side of a portion of the head extension.

Referring to the drawings, 1 represents a head having a recess 2, open at the bottom. The head is provided with laterally-projecting bosses 3 and 4 and also has an integral forwardly-projecting extension 5, and a thumb piece 6.

The cutting disk is indicated at 7 and as shown in Figs. 5 and 6, this cutting disk is mounted upon a two part spindle, one of the parts 8 having a reduced threaded stem 9 which is screwed into a threaded opening of the other part 10. The disk has a central aperture to receive a hub member 11 which has an annular flange 12 to embrace one side of the disk about its aperture and is threaded to receive a nut 13 to clamp the disk against the flange. Clamped between the members of the spindle is a ring 14, and the hub and ring are formed with opposed annular grooves to receive balls 15. The bosses 3 and 4 have aligned transversely-extending bores to receive the parts 8 and 10 of the spindle, these bores being threaded to receive screws 16 which serve to clamp the spindle against rotation and also provide means for adjusting the spindle axially to properly position the disk with relation to the straightedge. In assembling the parts the disk and its hub, as well as the ring 14 and balls 15 are first assembled, the edge of the hub being upset or swaged, as indicated at 17, to retain the ring and balls in position within the hub. This disk assembly is inserted in the recess of the head, the parts of the spindle inserted through the bores and secured together so as to clamp the ring 14 and the screws 16 then screwed to position to properly position the disk and hold the spindle against rotation.

A part which is usually termed a gage is shown at 18, this gage having a shelf upon which is mounted the upper horizontal flange 19' of a gage strip 19 which also has a lower horizontal flange 19" which cooperates with the under surface of the gage to form a groove-way for the overhanging flange 20 of a straight-edge 21. The forward extension 5 of the head is pivotally connected with the forward end of the gage by a pivot pin 22 and the gage also has a headed stud 23 which extends through a slotted opening 24 in the rear portion of the extension 5. The extension 5 also has a pair of downwardly-projecting ears 25 which cooperate with the gage plate 19 and its horizontal flange 19" to hold the tool against sidewise wobbling on the straight-edge.

In order to yieldably support the head from the gage, the extension 5 carries a spring formed from a pair of flat leaves 26 which extend into a recess 27 formed in the extension 5, the open side of which is adjacent the gage, with the forward ends of the springs placed with a tight fit in a cross groove 28 milled in the metal of the extension at the forward end of the recess 27. Cooperating with this spring is a pin 29 carried by the gage and projecting into the recess beneath the free end of the spring. When the head is depressed to cutting position the spring is put under tension and serves to restore the head to normal position.

By the construction described a very efficient arrangement is provided for mounting the cutting disk upon anti-friction bearings in the head of the tool and for adjusting the disk relatively to the straight-edge, so that the disk will rotate free from any running contact between its sides and the straight-edge or parts of the head. The spindle being held from rotation by the adjusting screws, with the disk turning upon the spindle, eliminates any friction between the spindle and its adjusting means and allows the rotating parts to turn freely with no other friction than that which exists in the anti-friction bearing.

By the arrangement of the spring which holds the head in inoperative position, an economical and effective arrangement is provided for the purpose.

Having thus described my invention, I claim:

1. In a tool of the character described, a supporting head, means for slidably mounting said head upon a straight-edge, a transversely-arranged spindle mounted in said head, anti-friction bearings carried by said spindle, a cutting disk rotatably mounted on said bearings, and adjustable means at each end of said spindle for adjusting the same axially in either direction and holding the same against rotation.

2. In a tool of the character described, a recessed supporting head, means for slidably mounting said head upon a straight-edge, aligned bosses formed on said head, a spindle mounted in said bosses, a disk rotatably connected with said spindle and located in the recessed portion of said head, and means in said bosses at each end of said spindle for adjusting said spindle axially and holding the same against rotation.

3. In a tool of the character described, a recessed supporting head, means for slidably mounting said head upon a straight-edge, aligned bosses formed on said head on opposite sides of the recessed portion thereof, a spindle mounted in said bosses, a disk rotatably mounted on said spindle in the recessed portion of said head, and a set-screw carried by each boss engageable with said spindle for adjusting said spindle axially in either direction and holding the same against rotation.

4. In a tool of the character described, a recessed supporting head, means for slidably mounting said head upon a straight-edge, aligned bosses formed on the respective sides of said recessed portion of said head, said bosses having aligned transversely-extending bores, a two-part spindle mounted in said bores having means for connecting the same together, anti-friction bearings carried by said spindle, a rotatable cutting disk mounted upon said bearings, and set-screws threaded in said bosses and engageable with the ends of said spindle for adjusting same axially in either direction and holding the same against rotation.

5. In a tool of the character described, a head, a cutting disk formed with a central aperture, a hub member secured in said aperture, a ring in said hub, balls between said ring and hub, and a two-part spindle mounted in said head arranged to clamp said ring between adjacent ends thereof.

6. In a tool of the character described, a recessed head, a two part spindle mounted in said head the parts of said spindle having a threaded connection, a cutting disk having a central aperture, a hub member having a flange and a threaded portion, a nut received on said threaded portion to clamp the disk against said flange, a ring within said hub, said ring and hub having opposed grooves, and balls in said grooves, said ring being clamped between adjacent ends of said spindle.

7. In a tool of the character described, a gage member, a head pivotally connected with said gage member, one of said members having a recess, a flat spring secured to said member and projecting into said recess, and a pin carried by the other member cooperating with said spring to hold said head member in raised position.

8. In a tool of the character described, a head having a forward extension, a gage member, means for pivotally connecting the forward end of said extension and the forward end of said gage member, said extension having a recess, a flat spring secured to said extension and projecting into said recess, said recess being open on the side adjacent to said gage, and a pin carried by said gage and projecting into said recess to cooperate with said spring to maintain said head in raised position.

In testimony whereof, I have hereunto set my hand this 12th day of August, 1927.

CHARLES E. GALVIN.